(12) United States Patent
Hamada

(10) Patent No.: US 9,379,934 B2
(45) Date of Patent: Jun. 28, 2016

(54) SERVER DEVICE FOR RECOMMENDING ELECTRONIC CONTENTS

(71) Applicant: DeNA Co., Ltd., Tokyo (JP)

(72) Inventor: Koichi Hamada, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 307 days.

(21) Appl. No.: 13/962,166

(22) Filed: Aug. 8, 2013

(65) Prior Publication Data
US 2014/0195648 A1 Jul. 10, 2014

(30) Foreign Application Priority Data
Jan. 7, 2013 (JP) ................................ 2013-000724

(51) Int. Cl.
| | |
|---|---|
| *G06F 15/16* | (2006.01) |
| *H04L 29/08* | (2006.01) |
| *G06Q 30/02* | (2012.01) |
| *A63F 13/79* | (2014.01) |
| *H04N 21/25* | (2011.01) |
| *H04N 21/442* | (2011.01) |
| *H04N 21/466* | (2011.01) |

(52) U.S. Cl.
CPC .......... *H04L 29/08081* (2013.01); *A63F 13/79* (2014.09); *G06Q 30/0282* (2013.01); *A63F 2300/535* (2013.01); *H04N 21/251* (2013.01); *H04N 21/44204* (2013.01); *H04N 21/4668* (2013.01)

(58) Field of Classification Search
CPC .............. H04L 29/06; H04L 29/08072; H04L 63/0428
USPC ......... 709/204, 220, 227, 203, 206, 224, 228; 715/738; 706/22
See application file for complete search history.

(56) References Cited

U.S. PATENT DOCUMENTS 6,697,840 B1 * 2/2004 Godefroid et al. ............ 709/205
7,716,293 B2 * 5/2010 Kasuga et al. ................ 709/206
(Continued)

FOREIGN PATENT DOCUMENTS

| JP | 2008-191768 | 8/2008 |
|---|---|---|
| JP | 2011-511981 | 4/2011 |

(Continued)

OTHER PUBLICATIONS

Japanese Office Action in connection with Japanese Patent Application No. 2013-000724 issued on Sep. 3, 2013.

*Primary Examiner* — Khanh Dinh

(74) *Attorney, Agent, or Firm* — Pillsbury Winthrop Shaw Pittman LLP

(57) ABSTRACT

The server device according to the embodiments provides users with more reliable recommendation information on electronic contents. This server device includes a game progression control unit for controlling progression of a game, an information storage unit for storing information, and a display control unit. The information storage unit includes: a use status management table for managing use status for each user of a plurality of online games provided by the server device; and a user-to-user relationship management table for managing information on relationship between users. The display control unit determines games to be recommended to a user based on information stored in the use status management table and the user-to-user relationship management table, and causes a terminal device to display information related to the games.

6 Claims, 5 Drawing Sheets

(56) References Cited

U.S. PATENT DOCUMENTS

| | | | |
|---|---|---|---|
| 8,867,575 B2 * | 10/2014 | Mohammed | H04L 63/0428 370/546 |
| 9,106,768 B2 * | 8/2015 | Mohammed | H04L 63/0428 |
| 9,288,337 B2 * | 3/2016 | Mohammed | H04L 63/0428 |
| 2009/0197681 A1 | 8/2009 | Krishnamoorthy et al. | 463/42 |
| 2013/0073618 A1 | 3/2013 | Takamura et al. | 709/203 |
| 2013/0246929 A1 * | 9/2013 | Hoffman et al. | 715/738 |
| 2014/0100028 A1 * | 4/2014 | Jalili | 463/31 |
| 2014/0157369 A1 * | 6/2014 | Mischook et al. | 726/4 |
| 2014/0207860 A1 * | 7/2014 | Wang et al. | 709/204 |

FOREIGN PATENT DOCUMENTS

| | | |
|---|---|---|
| JP | 2011-232836 | 11/2011 |
| JP | 2011-257916 | 12/2011 |

\* cited by examiner

Use Status Management Table 52a

| User ID | Game ID | Use Status | ... |
|---|---|---|---|
| U0001 | G001 | Install | ... |
| U0001 | G003 | Play | ... |
| U0001 | G007 | Play | ... |
| U0001 | G014 | Special Play | ... |
| ... | ... | ... | ... |
| U0004 | G002 | Play | ... |
| U0004 | G003 | Play | ... |
| U0004 | G007 | Play | ... |
| U0004 | G014 | Install | ... |
| ... | ... | ... | ... |
| U0009 | G003 | Play | ... |
| U0009 | G006 | Install | ... |
| U0009 | G007 | Special Play | ... |
| U0009 | G014 | Play | ... |
| ... | ... | ... | ... |

User-to-user Relationship Management Table 52b

| User ID 1 | User ID 2 | Relationship | ... |
|---|---|---|---|
| U0001 | U0002 | Friend | ... |
| U0001 | U0005 | Friend | ... |
| U0001 | U0007 | Friend | ... |
| U0001 | U0009 | Circle Company | ... |
| ... | ... | ... | ... |
| U0002 | U0004 | Circle Company | ... |
| U0002 | U0006 | Friend | ... |
| ... | ... | ... | ... |
| U0003 | U0008 | Circle Company | ... |
| ... | ... | ... | ... |

Fig. 5

SERVER DEVICE FOR RECOMMENDING ELECTRONIC CONTENTS

CROSS-REFERENCE TO RELATED APPLICATIONS

This application is based on and claims the benefit of priority from Japanese Patent Application Serial No. 2013-000724 (filed on Jan. 7, 2013), the contents of which are hereby incorporated by reference in their entirety.

TECHNICAL FIELD

The present invention relates to a server device and a method of recommending electronic contents by using the server device, and in particular, to a server device capable of providing a plurality of electronic contents to users operating a plurality of terminal devices communicatively connected and a method of recommending electronic contents by using the server device.

BACKGROUND

Conventionally proposed such server devices include a system aimed at recommending contents that fit preferences of individual users (see, e.g., Japanese Patent Application Publication No. 2008-191768). In this system, recommendation information on contents is exchanged between users in a SNS-based network group formed in accordance with preferences of users, such that the users can obtain recommendation information on contents that fit their own preferences.

SUMMARY

However, since such recommendation of contents utilizing the SNS-based network requires participation in the SNS-based network as a prerequisite, it cannot cover users unwilling to participate a SNS-based network. Additionally, it is unknown to what degree the contents are actually used by the users who provide the recommendation information; therefore, the reliability of the recommendation information is also uncertain. Thus, there is possibility that users hesitate to use the recommended contents.

One object of the present invention is to provide users with more reliable recommendation information on electronic contents. Other objects of the present invention will be clarified by reference to the entire description in this specification.

A server device according to an embodiment of the present invention is a server device capable of providing a plurality of electronic contents to a plurality of users each operating a terminal device communicatively connected to the server device, the server device comprising: an information storage unit configured to store use status information for each of the plurality of users, the use status information indicating a use status for each of the plurality of electronic contents in a plurality of stages; and a display control unit configured to cause, in response to a request from the terminal device, the terminal device to display information on one or more of the plurality of electronic contents, the one or more of the plurality of electronic contents being recommended to one of the plurality of users operating the terminal device, wherein the one or more of the plurality of electronic contents are recommended to the one of the plurality of users based on the use status information on the one of the plurality of users operating the terminal device and the use status information on other users other than the one of the plurality of users operating the terminal device.

A method according to an embodiment of the present invention is a A method of recommending electronic contents by using a server device capable of providing a plurality of electronic contents to a plurality of users each operating a terminal device communicatively connected to the server device, the method comprising the steps of: (a) storing use status information for each of the plurality of users in the server device, the use status information indicating a use status for each of the plurality of electronic contents in a plurality of stages; and (b) causing, in response to a request from one of the plurality of terminal devices, the terminal device to display information on one or more of the plurality of electronic contents, the one or more of the plurality of electronic contents being recommended to one of the plurality of users operating the terminal device, wherein the one or more of the plurality of electronic contents are recommended to the one of the plurality of users based on the use status information on the one of the plurality of users operating the terminal device and the use status information on other users other than the one of the plurality of users operating the terminal device.

Various embodiments of the present invention provide users with more reliable recommendation information on electronic contents.

BRIEF DESCRIPTION OF THE DRAWINGS

FIG. 5 is a diagram showing a specific example of a user-to-user relationship management table according to an embodiment.

DESCRIPTION OF EXAMPLE EMBODIMENTS

Figure 1:
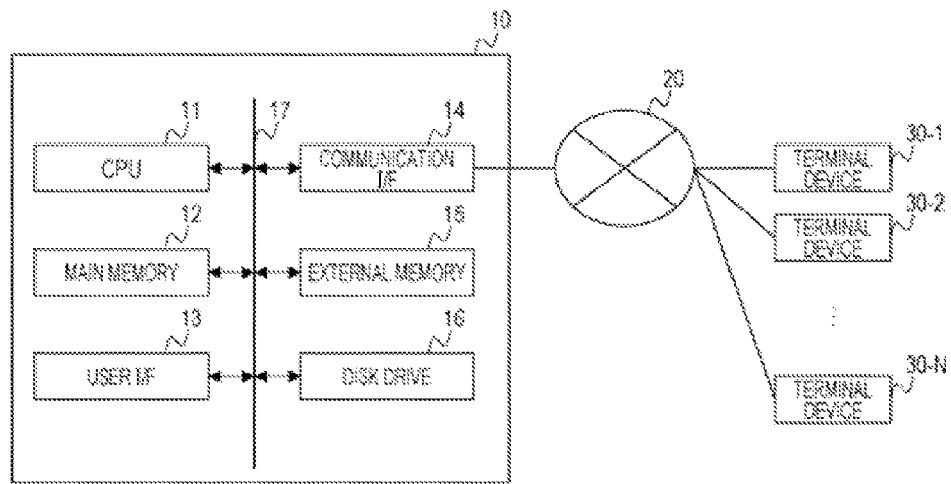
FIG. 1 is a block diagram schematically illustrating a network configuration of a system including a server device according to an embodiment of the present invention.

Various embodiments of the present invention will be described hereinafter with reference to the drawings. In the drawings, the same components are denoted by the same reference numerals.

FIG. 1 is a block diagram schematically illustrating a system including a server device 10 according to an embodiment of the present invention. As illustrated in FIG. 1, the server device 10 according to an embodiment may be communicatively connected to a plurality of terminal devices 30-1, 30-2, . . . , and 30-N (hereinafter also collectively referred to as the "terminal devices 30"), each having a communication function, via a communication network 20 such as the Internet. The server device 10 may provide users operating the terminal devices 30 with various electronic contents including online games, electronic books, video contents, and music contents and various services such as SNS services.

As illustrated in FIG. 1, a server device 10 according to an embodiment may include a central processing unit (CPU) 11, a main memory 12, a user interface (I/F) 13, a communication I/F 14, an external memory 15, and a disk drive 16, and these components may be electrically connected to one another via a bus 17. The CPU 11 may load an operating system and various programs into the main memory 12 from the external memory 15, and may execute commands included in the loaded programs. The main memory 12 may be used to store a program to be executed by the CPU 11, and may be formed of, for example, a dynamic random access memory (DRAM).

As illustrated in FIG. 1, the server device 10 may include a central processing unit (CPU) 11, a main memory 12, a user interface (I/F) 13, a communication I/F 14, an external memory 15, and a disk drive 16, and these components may be electrically connected to one another via a bus 17. The CPU 11 may load an operating system and various programs for controlling the progress of an online game into the main memory 12 from the external memory 15, and may execute commands included in the loaded programs. The main memory 12 may be used to store a program to be executed by the CPU 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminal devices 30 via the communication network 20.

The external memory 15 may be formed of, for example, a magnetic disk drive and store various programs such as a control program for controlling the progress of an online game. The external memory 15 may also store various data used in the game. The various data that may be stored in the external memory 15 may also be stored on a database server communicatively connected to the server device 10 and physically separate from the server device 10. The disk drive 16 may read data stored in a storage medium such as a compact disc read only memory (CD-ROM), digital versatile disc read only memory (DVD-ROM), or DVD Recordable (DVD-R) disc, or writes data to such a storage medium. For example, a game application and data such as game data stored in a storage medium may be read by the disk drive 16, and may be installed into the external memory 15.

In an embodiment, the server device 10 may be a web server for managing a web site including a plurality of hierarchical web pages and may be capable of providing the terminal devices 30 with game services. The terminal devices 30 may fetch HTML data for rendering a web page from the server device 10 and analyze the HTML data to present the web page to a user of the terminal devices 30. A game provided through such a web page is sometimes called a browser game. The HTML data for rendering the web page may also be stored on the external memory 15. HTML data may comprise HTML documents written in markup languages such as HTML; the HTML documents may be associated with various images. Additionally, the HTML documents may include programs written in script languages such as ActionScript™ and JavaScript™.

The external memory 15 may store game applications to be executed on execution environments of the terminal device 30 other than browser software. This game application may include game programs for performing a game and various data such as image data to be referred to for executing the game programs. The game programs may be created in, for example, object oriented languages such as Objective-C™ and Java™. The created game programs may be stored on the external memory 15 in the form of application software along with various data. The application software stored on the external memory 15 may be delivered to a terminal device 30 in response to a delivery request. The application software delivered from the server device 10 may be received by the terminal device 30 through a communication I/F 34 in accordance with the control of CPU 31; the received game programs may be sent to an external memory 35 and stored thereon. The application software may be launched in accordance with the user's operation on the terminal device 30 and may be executed on a platform implemented on the terminal device 30 such as NgCore™ or Android™. The server device 10 may provide the game applications executed on the terminal devices 30 with various data required for progression of the games. Additionally, the server device 10 can store various data sent from the terminal device 30 for each user, thereby managing the progression of the game for each user.

Thus, the server device 10 may manage the web site for providing game services and deliver web pages constituting the web site in response to a request from the terminal device 30, thereby progressing the game. Also, the server device 10 can progress a game by communicating with a game application performed on the terminal device 30 in place of, or in addition to, such a browser game. Whichever mode may be taken to provide the game, the server device 10 can store data required to progress the game for each identification identifying a user. Briefly, the server device 10 may also include a function to authenticate a user at start of the game and perform charging process in accordance with progression of the game. The games provided by the server device 10 may include desired games such as action games, role playing games, interactive baseball games, and card games. The types of the games implemented by the web site or game applications of the server device 10 are not limited to those explicitly described herein.

In an embodiment, the terminal device 30 may be any information processing device that may display on a web browser a web page of a game web site obtained from the server device 10 and include an application executing environment for executing game applications.

Figure 2:
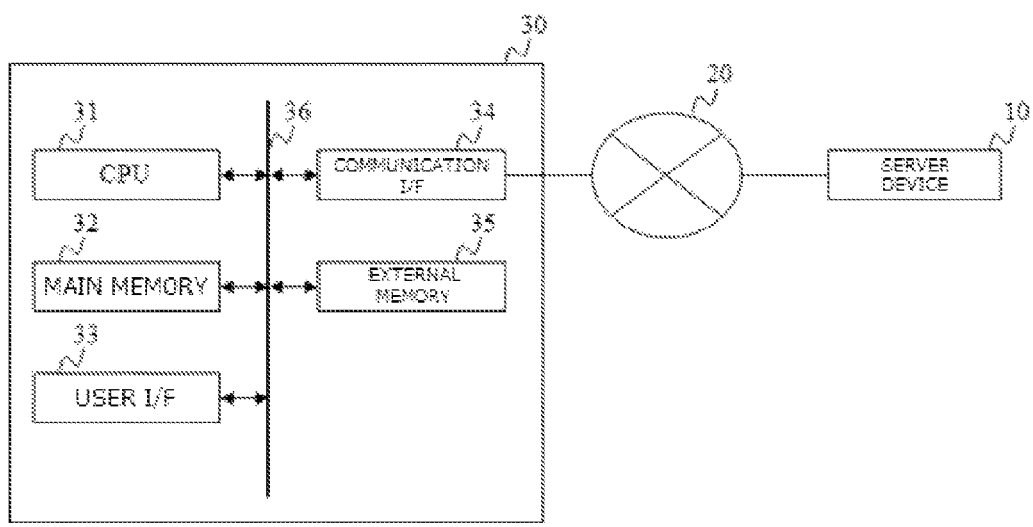
FIG. 2 is a block diagram schematically illustrating the architecture of a terminal device according to an embodiment.

The architecture of the terminal device 30 will be described with reference to FIG. 2. FIG. 2 is a block diagram schematically illustrating the architecture of a terminal device 30. As illustrated in FIG. 2, the terminal device 30 may include a central processing unit (CPU) 31, a main memory 32, a user interface (I/F) 33, a communication I/F 34, and an external memory 35, and these components may be electrically connected to one another via a bus 36.

The CPU 31 may load various programs such as an operating system into the main memory 32 from the external memory 35, and may execute commands included in the loaded programs. The main memory 32 may be used to store a program to be executed by the CPU 31, and may be formed of, for example, a dynamic random access memory (DRAM).

The user I/F 33 may include, for example, an information input device such as a touch panel, a keyboard, a button, and a mouse for accepting an input from a user, and an information output device such as a liquid crystal display for outputting calculation results of the CPU 31. The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server device 10 via the communication network 20.

The external memory 35 may comprise, for example, a magnetic disk drive or a flash memory and store various programs such as an operating system. When receiving a game application from the server device 10 via the communication I/F 34, the external memory 35 may store the received game application.

A terminal device 30 having such an architecture may include, for example, browser software for interpreting an HTML file (HTML data) and rendering a screen; this browser software may enable the terminal device 30 to interpret the HTML data fetched from the server device 10 and render web pages corresponding to the received HTML data. Further, the terminal device 30 may include plug-in software (e.g., Flash Player distributed by Adobe Systems Incorporated) embedded into browser software; therefore, the terminal device 30 can fetch from the server device 10 a SWF file embedded in HTML data and execute the SWF file by using the browser software and the plug-in software.

When a game is executed on the terminal device 30, for example, animation or an operation icon designated by the program may be displayed on a screen of the terminal device 30. The user may enter an instruction for progressing the game using an input interface of the terminal device 30. The instruction entered by the user may be transmitted to the server device 10 through the browser of the terminal device 30 or a platform function such as NgCore™.

Figures 3, 4:
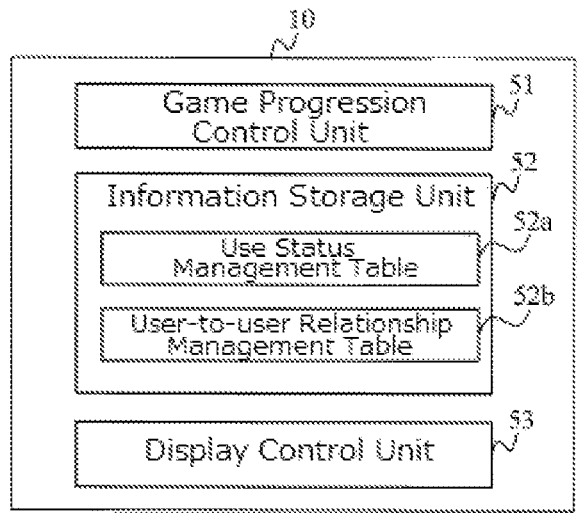
FIG. 3 is a block diagram illustrating the functionality of the server device according to an embodiment.
FIG. 4 is a diagram showing a specific example of a use status management table according to an embodiment.

Next, the functionality of the server device 10 implemented by the components shown in FIG. 1 will now be described. As described above, the server device 10, which can provide various services including electronic contents, will now be described with a focus on functions related to online games as electronic contents. Online games are examples suitable for description of an embodiment of the present invention. FIG. 3 is a block diagram illustrating the functionality of a server device 10 according to an embodiment of the present invention. As shown, the server device 10 may comprise a game progression control unit 51 for controlling progression of games, an information storage unit 52 for storing information, and a display control unit 53 for causing the terminal device 30 to display information on games to be recommended to users. These functions may be implemented through cooperation between the CPU 11 of the server device 10 and various programs, tables, and the like stored in the main memory 12 and the external memory 15.

The game progression control unit 51 may send and receive various data required for the progression of the game to and from the terminal device 30 and manage such data for each user, thereby controlling the progression of the game for each user. For example, the game progression control unit 51 can sequentially display, on the terminal device 30, web pages constituting a web site for providing game services in response to a request from the terminal device 30. When a hyperlink on the displayed web page is selected by the user, the game progression control unit 51 may send new HTML data corresponding to the hyperlink to the terminal device 30. The terminal device 30 may display a web page based on the new HTML data. Thus, the game progression control unit 51 may control the game such that web pages stored on the server device 10 are sequentially provided to the terminal device 30 in accordance with the operation by the user; and the user can progress the game by his own operation through the function of the game progression control unit 51.

When the terminal device 30 executes the game application, the game progression control unit 51 can send various data used in the game to the game application. For example, when receiving from a game application on the terminal device 30 a control signal indicating that a certain mission has been cleared, the game progression control unit 51 may provide the game application with various parameters related to a mission subsequent to the cleared mission. The game application may load the data provided by the server device 10 and progress the game.

The terminal device 30 can appropriately send to the server device 10 various information on progression of the game such as information indicating various parameter values used in the game (information on earned game points and earned items) and information indicating a status (information specifying a fulfilled mission), through the function of browser software or the game application. The game progression control unit 51 may store, for each user, information on the progression of the game received from a plurality of terminal devices 30, thereby controlling the progression of the game for each user. Thus, when the user logs in the server device 10 using his own ID, the game may be resumed from the stage corresponding to the progression of the user (e.g., the stage where the game was interrupted) based on the information on the progression of the game associated with the user and stored in the server device 10. The information required for the progression of the game may also be managed by various functions of the server device 10 other than the game progression control unit 51.

The information storage unit 52 may include: a use status management table 52a for managing use status for each user of a plurality of online games provided by the server device 10; and a user-to-user relationship management table 52b for managing information on relationship between users. FIG. 4 illustrates a specific example of the use status management table 52a. As shown, the use status management table 52a may manage information such as "use status" indicating the use status of a user for a game in a plurality of stages, in association with a combination of a "user ID" identifying a user and a "game ID" identifying a game used by the user. In an embodiment, values of the "use status" may be "install," "play" and "special play." The value "install" may indicate a stage where the user has become ready to start the game by installing an application for playing the game on the terminal device 30 or performing the game once through a browser. The value "play" may indicate a stage where the user is actually playing the game after "installation"; and the value "special play" may indicate a stage where the user is actually and more deeply playing the game. The stages "install," "play," and "special play" may be set under various rules based on the use history of the game for the user. For example, a rule may be that "install" may indicate the number of logins to the game smaller than five, "play" may indicate the number of logins equal to or greater than 6 and smaller than 100, and "special play" may indicate the number of logins equal to or greater than 100; or another rule may be that "install" may indicate the length of game play less than one hour, "play" may indicate the length of game play equal to or greater than one and less than 200 hours, and "special play" may indicate the length of game play greater than 200 hours. Still another rule may be that "play" may indicate that no special game contents (e.g., cards or items) are used in the game, and "special play" may indicate that a special game content is used. Such use history of a game may be managed by a table stored in the information storage unit 52 but not shown in the drawings. Thus, the use status management table 52a may be updated in accordance with use history of the game for each user. It should be noted that the rules described above are mere examples, and other rules should naturally be applicable. Additionally, the values of "use status" may include "before installation," which may indicate the stage where the game is not yet ready to be started.

FIG. 5 illustrates a specific example of the user-to-user relationship management table 52b. As shown, the user-to-user relationship management table 52b may manage information such as "relationship" representing the relationship between two users indicated by the two user IDs ("user ID 1" and "user ID 2"). The values of the "relationship" in an embodiment may include "friend," a relationship formed when a user approves a friend application from another user, and "circle company," a relationship between users included in a same circle. The circle is one of SNS services provided by the server device 10 wherein users mutually exchange information on a subject via a message board, etc. In an embodiment, friends and circle companies may be managed by the user-to-user relationship management table 52b; however, other tables may also be used to manage these information. As to "circle company" for example, a table for managing information on users may manage circles including the users; and based on this information, users included in a same circle may be specified.

Figure 6:
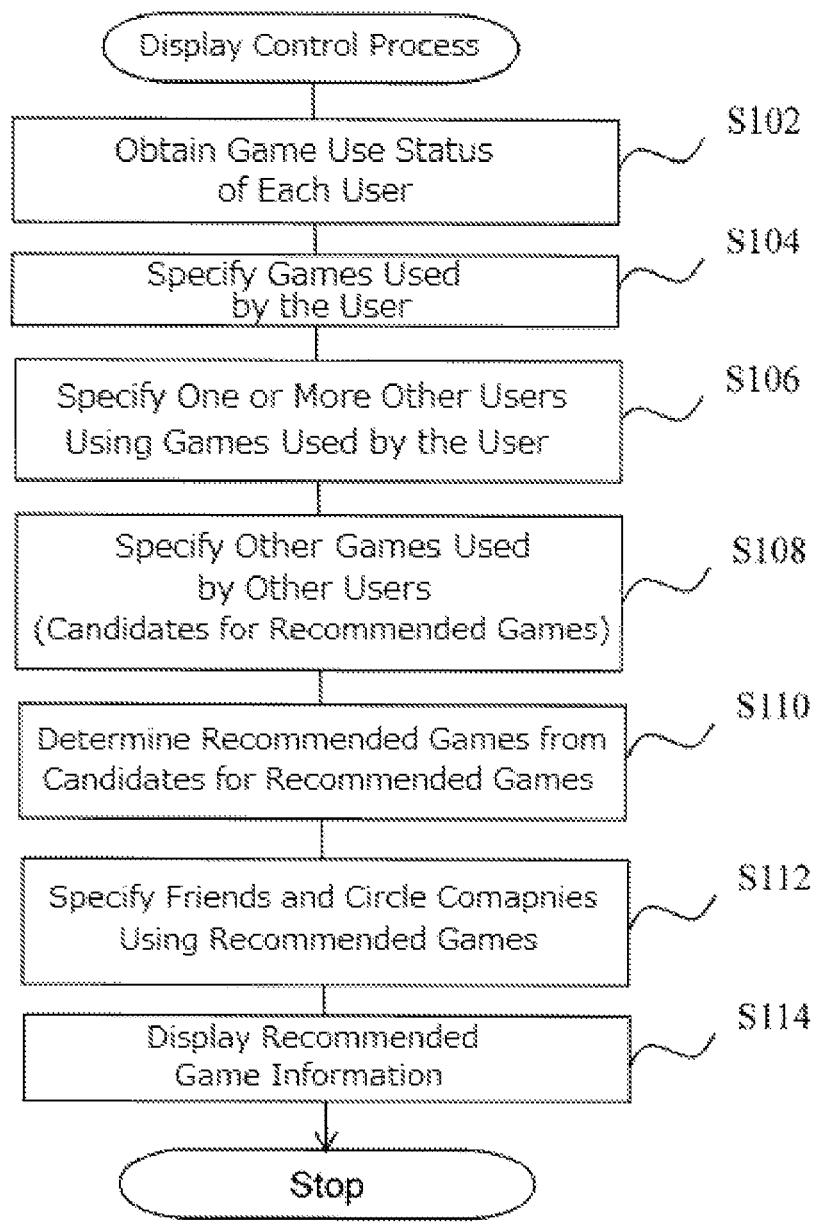
FIG. 6 is a flow diagram showing an example of a display control process according to an embodiment.

Next, operations of such a server device 10 as an embodiment of the present invention will now be described. FIG. 6 is a flow diagram showing an example of a display control process performed by the server device 10. This display control process may be performed when the server device 10 receives from a terminal device 30 a display request for a screen for displaying recommended game information on recommended games. Such recommended game information may be displayed on various screens such as My Game screen from which users start a game and My Page screen from which users start a SNS service.

The first step of the display control process may be to access the use status management table 52a to obtain game use status of each user (step S102). After obtaining the use status of the games for each user, the server device 10 may perform a series of steps to determine a game to be recommended to the user operating the terminal device 30 which has made the display request for the screen for displaying the recommended game information, based on the game use status of the user and the game use status of one or more other users (steps S104 to S110).

First, the server device 10 may specify games used by the user (step S104). In an embodiment, the server device 10 may specify games for which the user is in a use status of "play" or "special play" as used games. Referring to the specific example shown in FIG. 4, the user identified by the user ID "U0001" is in the use status of "play" for the game IDs "G003" and "G007" and is in the use status of "special play" for the game ID "G014"; therefore, the games identified by the game IDs "G003," "G007," and "G014" may be specified as the games used by the user identified by the user ID "U0001."

Next, the server device 10 may specify one or more other users using the games specified as the games used by the user (step S106). In an embodiment, the server device 10 may specify one or more other users in the use status of "play" or "special play" for the used games. Referring to the specific example shown in FIG. 4, the user identified by the user ID "U0004," for example, is in the game use status of "play" for game IDs "G003" and "G007" and thus may be specified as one of the other users. The user identified by the user ID "U0009" is in the game use status of "play" for game IDs "G003" and "G014" and is in the game use status of "special play" for the game ID "G007," and thus may be specified as one of the other users.

Subsequently, the server device 10 may specify, as candidates for recommended games, thus specified other games used by the one or more other users (not including the used games specified in step S104) (step S108). In an embodiment, the server device 10 may specify, as candidates for recommended games, the other games for which the one or more other users are in a use status of "play" or "special play."

Next, the server device 10 may determine recommended games to be actually recommended to the user from among the specified candidates for recommended games (step S110). In this step, various rules may be applicable for determining recommended games to be actually recommended to the user from among the candidates for recommended games. For example, an applicable rule may be that a plurality of specified candidates for recommended games should be prioritized by a predetermined rule, and a predetermined number (e.g., two) of top priority games should be determined to be recommended games. The predetermined rule for prioritizing a plurality of candidates for recommended games may be that, for example, games released more recently should have higher priorities, or that games used by more of the other users should have higher priorities. Further, when the games used by more of the other users should have higher priorities, the candidates for recommended games may be prioritized by using a value produced by adjusting the number of users in accordance with the stage representing the use status (e.g., a user in the use status of "play" may be counted as one user, and a user in the use status of "special play" may be counted as two users).

After thus determining the recommended games to be actually recommended to the user, the server device 10 may subsequently specify users who use the determined recommended games from among users in relationship of "friend" or "circle company" with the user (step S112). More specifically, the sever device 10 may access the use status management table 52a to extract other users in the use status of "play" or "special play" for the recommended games, and access the user-to-user relationship management table 52b to extract other users in relationship of "friend" or "circle company" with the user; and the server device 10 may match these two sets of users to specify the users who are in relationship of "fried" or "circle company" with the user and using the determined recommended games.

Figure 7:
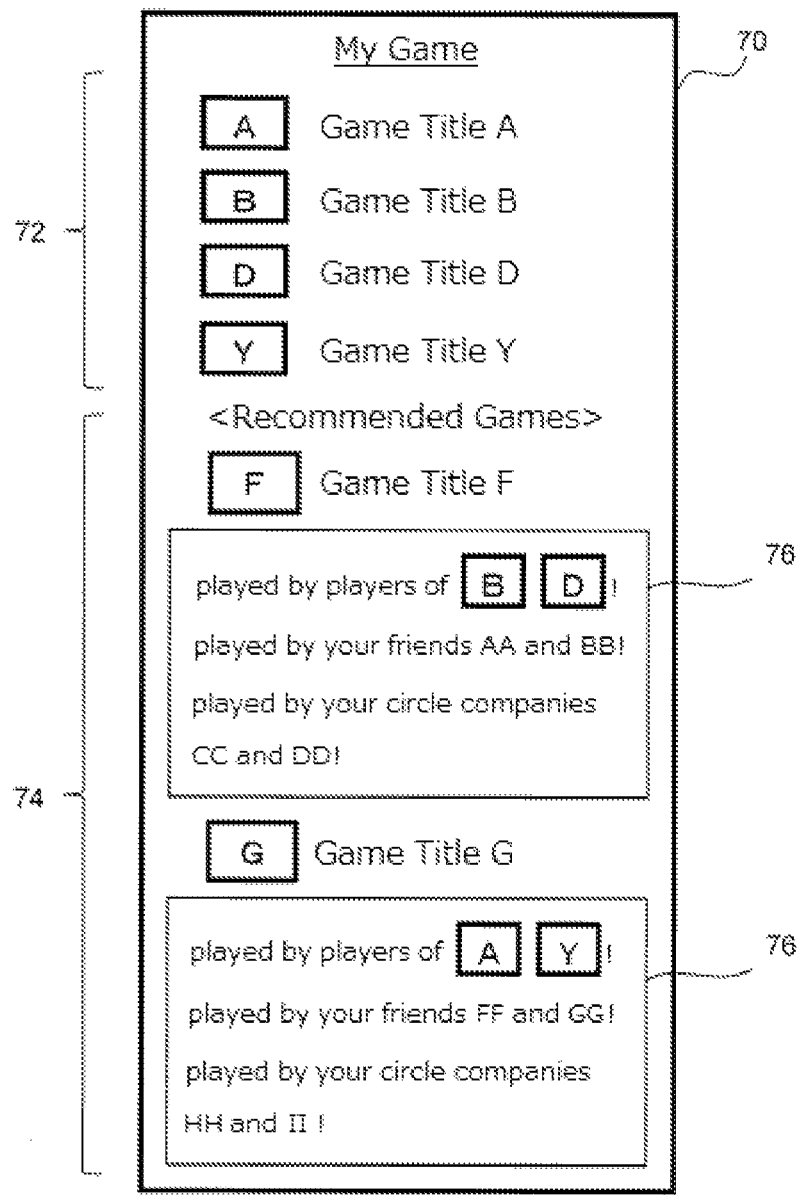
FIG. 7 is a diagram showing an example of My Game screen according to an embodiment.

Next, the server device 10 may send recommended game information on the determined recommended games to the terminal device 30 for display (step S114) and end the display control process. FIG. 7 shows an example of My Game screen 70 for displaying the recommended game information. As shown, My Game screen 70 may include a game list display section 72 for listing games already started by the user, and a recommended game information display section 74 for displaying recommended game information to the user. The game list display section 72 may include game icons in the left corresponding to the listed games, and game titles, that is, the names of the games, on the right of the game icons. When the user selects a game icon or a game title, an application or browser installed on the terminal device 30 may be launched to start the selected game. In an embodiment, the game list display section 72 may display games registered in the use status management table 52a as the games used by the user.

As shown, the recommended game information display section 74 of the My Game screen 70 may display a plurality of recommended games (e.g., two recommended games) recommended to the user, wherein a game icon and a game title may be displayed for each of the recommended games. Below the area displaying the game icons and the game titles is provided a related information display area 76 for displaying related information on the recommended games. As shown, the related information display area 76 may display other games commonly used by this user and the other users using the recommended game (e.g., FIG. 7 includes "played by players of [icon B] [icon D]!") and may also display friends and circle companies using the recommended game (e.g., FIG. 7 includes "played by your friends AA and BB!" and "played by your circle companies CC and DD!"). The other game commonly used by this user and the other user using the recommended game may be displayed in such a way that, for example, a plurality of other games commonly used are prioritized and a predetermined number (e.g., two) of top priority games are displayed. In this case, various rules may be applied for prioritizing the plurality of other games; for example, one such rule may be that games released more recently should have higher priorities, or that games used by more of the other users should have higher priorities. Further, it may also be possible to preferentially display games for which this user (who operates the terminal device 30 displaying the recommended game information) is in the use status of "special play." The friends and circle companies using the recommended games may be displayed in such a way that, for example, the friends and circle companies using the recommended games are prioritized and a predetermined number (e.g., two) of top priority users are displayed. In this case, various rules may be applied for prioritizing the friends and circle companies; for example, one such rule may be that the priorities depend on the time when the users became friends or circle companies (e.g., the users who have become friends or circle companies earlier should have higher priorities). When the user selects a game icon or a game title of a recommended game displayed in the recommended game information display section 74 of My Game screen 70, the screen may transition to a download screen of an application corresponding to the selected game or a game starting screen corresponding to the selected game, thereby enabling the user to start the game.

The recommended game information display section 74 of My Game screen 70 may display information on the use status for the recommended game to be recommended to the user. For example, if the user is in the use status of "install" for the recommended game, the recommended game information display section 74 may display to that effect and display the last login time (e.g., year and month). Additionally, for example, if the number or percentage of the users in the use status of "special play" among the other users using the recommended game is greater than a predetermined value (e.g., one million users or 50%), the recommended game information display section 74 may display information to that effect (e.g., information indicating that many players use special game contents in playing the recommended game). Thus, display may be arranged in accordance with the use statuses of the user and the other users for the recommended games so as to enhance the effect of recommending the games.

Further, the recommended game information display section 74 of My Game screen 70 may display information on the features of the recommended games or event information. For example, the message displayed may be "Image quality highest ever!" representing a feature of the recommended game or "Rare cards presented to everyone now!" representing event information. This may further enhance the effect of recommending games to the user.

It may also be possible to control the recommended game information display section 74 of My Game screen 70 such that the recommended games are not displayed again, depending on the situation after these games are first displayed. For example, after the counted times of display (times of sending) reaches a predetermined number (e.g., ten), the recommended games may not be displayed again; or, after a predetermined days (e.g., 30 days) passed from the registered date and time when the recommended game was first displayed, the recommended game may not be displayed again. When a recommended game is not displayed again, another new recommended game may be determined and displayed.

As described above, the server device 10 according to the embodiment of the present invention may determine recommended games to be recommended to the user operating the terminal device 30 in accordance with the game use status for each user managed by the use status management table 52a, and may cause the terminal device 30 to display the information on the determined recommended games. Accordingly, since recommended games may be determined based on the actual game use status for each user, more reliable recommendation information may be provided to the user. Further, the displayed information on the recommended games may include other games commonly used by the user operating the terminal device 30 and other users using the recommended games, and friends and circle companies using the recommended games; therefore, the user can grasp what he shares with the other users using the recommended games and, based thereon, determine whether to start using the recommended games.

The server device 10 according to the embodiment may use a reference of whether the use status is "play" or "special play" to specify the games used by the user, specify other users using the used games, and specify other games used by other users (candidates for recommended games); and different references may be used. For example, the games specified as the games used by the user may also include the games for which the user is in the use status of "install." Further, for example, the game specified as candidates for recommended games may only include the games for which the user is in the use status of "special play" not "play." Thus, recommended games may be determined in accordance with the stage representing the use status for the games; this may enable recommended games to be determined more flexibly.

The server device 10 according to the embodiment was described for the case of recommending online games for example; and the present invention may also be applied to recommendation of other electronic contents such as electronic books, video contents, and music contents. In this case, the plurality of stages representing the use statuses may be set in accordance with the type of the electronic contents. For example, for video contents and music contents, the stages representing the use statuses may include "free viewing," "charged download," etc.

The processes and procedures described and illustrated herein may be implemented by software, hardware, or any combination thereof other than those explicitly stated for the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

Even if the processes and the procedures described herein are executed by a single apparatus, software piece, component, or module, such processes and procedures may also be executed by a plurality of apparatuses, software pieces, components, and/or modules. Even if the data, tables, or databases described herein are stored in a single memory, such data, tables, or databases may also be dispersed and stored in a plurality of memories included in a single apparatus or in a plurality of memories dispersed and arranged in a plurality of apparatuses. The elements of the software and the hardware described herein can be integrated into fewer constituent elements or can be decomposed into more constituent elements.

With respect to the use of substantially any plural and/or singular terms herein, those having skill in the art can translate from the plural to the singular and/or from the singular to the plural as is appropriate to the context.

What is claimed is:

1. A server device configured to provide a plurality of electronic contents to a plurality of users each operating a terminal device communicatively connected to the server device, the plurality of the users including a first user, the plurality of electronic contents including first electronic contents being used by the first user, the server device comprising:
    an information storage unit configured to store use status information for each of the plurality of the users, the use status information indicating a use status for each of the plurality of electronic contents in a plurality of stages, wherein the use status includes at least a status of using the plurality of the electronic contents by the plurality of the users; and
    a central processing unit configured, by the machine-readable instructions, to:
    determine a second electronic content as a content to be recommended to the first user, the second electronic content being independent and distinct from any one of the first electronic contents;
    identify one or more users who are in the status of using the second electronic content and at least one of the first electronic contents based on the use status information; and
    cause, in response to a display request from the terminal device of the first user requesting display of a screen, the terminal device of the first user to display the screen,
    wherein the screen includes information regarding the first electronic contents, information identifying the second electronic content, and related information related to the second electronic content, wherein the related information indicates the one or more users are in the status of using of the at least one of the first electronic contents.

2. The server device of claim 1, wherein
the information storage unit is further configured to store user-to-user relationship information indicating predetermined relationship between the plurality of users, in addition to the use status information; and,
the related information includes information regarding the one or more users being in the use status of using the second electronic content and in a predetermined relationship with the first user.

3. The server device of claim 1 wherein the electronic content includes at least one of online games, electronic books, video contents, and music contents.

4. A method of recommending electronic contents by using a server device configured to provide a plurality of electronic contents to a plurality of users each operating a terminal device communicatively connected to the server device, the plurality of the users including a first user, the plurality of electronic contents including first electronic contents being used by the first user, the method comprising
    storing use status information for each of the plurality of the users in the server device, the use status information indicating a use status for each of the plurality of electronic contents in a plurality of stages, wherein the use status includes at least a status of using the plurality of the electronic contents by the plurality of the users;
    determining a second electronic content as a content to be recommended to the first user, the second electronic content being independent and distinct from any one of the first electronic contents;
    identifying one or more users who are in the status of using the second electronic content and at least one of the first electronic contents based on the use status information; and
    causing, in response to a display request from the terminal device of the first user requesting display of a screen, the terminal device of the first user to display the screen,
    wherein the screen includes information regarding the first electronic contents, information identifying the second electronic content, and related information related to the second electronic content, wherein the related information indicates the one or more users are in the status of using of the at least one of the first electronic contents.

5. The server device of claim 1, wherein the central processing unit is further configured by the machine-readable instructions such that the information identifying the second electronic content is not included in the screen if a number of times of displaying the information identifying the second electronic content is equal to or greater than a predetermined number.

6. The server device of claim 1, wherein the central processing unit is further configured by the machine-readable instructions such that the information identifying the second electronic content is not included in the screen if a predetermined number or more of days have elapsed after the information identifying the second electronic content was first displayed.

* * * * *